United States Patent
Keiser

(10) Patent No.: US 6,948,699 B1
(45) Date of Patent: Sep. 27, 2005

(54) RETAINER FOR A BALL VALVE SEAT

(76) Inventor: David B. Keiser, c/o Griswold Controls P.O. Box 19612, Irvine, CA (US) 92623

( * ) Notice: Subject to any disclaimer, the term of this patent is extended or adjusted under 35 U.S.C. 154(b) by 195 days.

(21) Appl. No.: 10/260,864

(22) Filed: Sep. 27, 2002

Related U.S. Application Data

(60) Provisional application No. 60/327,617, filed on Oct. 5, 2001.

(51) Int. Cl.[7] .............................................. F16K 5/00
(52) U.S. Cl. .................................... 251/315.1; 251/316
(58) Field of Search ....................... 251/315.01, 315.1, 251/315.13–315.15, 314, 316

(56) References Cited

U.S. PATENT DOCUMENTS

| | | | |
|---|---|---|---|
| 2,963,262 A * | 12/1960 | Shafer | 251/172 |
| 3,460,802 A * | 8/1969 | Colby et al. | 251/172 |
| 4,047,275 A * | 9/1977 | Bake et al. | 29/890.127 |
| 4,061,307 A * | 12/1977 | Yoshiike et al. | 251/315.08 |
| 4,071,220 A * | 1/1978 | Iino | 251/174 |
| 4,815,701 A | 3/1989 | Stone | |
| 4,911,408 A | 3/1990 | Kemp | |
| 5,088,687 A | 2/1992 | Stender | |
| 5,707,042 A | 1/1998 | Maselli et al. | |
| 5,819,792 A | 10/1998 | Reynolds | |
| 6,065,736 A | 5/2000 | Hunt | |
| 6,116,575 A | 9/2000 | Ahn | |
| 6,206,023 B1 | 3/2001 | Landers | |

FOREIGN PATENT DOCUMENTS

| | | |
|---|---|---|
| EP | 0397725 | 11/1990 |
| EP | 0539656 | 5/1993 |
| EP | 0763680 | 3/1997 |
| WO | WO-8910506 | 11/1989 |
| WO | WO-9902904 | 1/1999 |
| WO | WO-0142695 | 6/2001 |

* cited by examiner

Primary Examiner—J. Casimer Jacyna
(74) Attorney, Agent, or Firm—David S. Alavi

(57) ABSTRACT

A ball valve comprises: a valve body; a pair of valve end caps; a valve ball rotatably positioned within the valve body; a pair of valve seats, each valve seat being positioned between the valve ball and a respective valve end cap and engaged therewith; and at least one of i) an O-ring in an outer circumferential groove on a valve seat and compressively engaged with an inner surface of the valve end cap for retaining the valve seat within the end cap, ii) a circumferential groove provided on an inner surface of the valve end cap and positioned for receiving the O-ring positioned within the groove of the valve seat for retaining the valve seat within the end cap, and iii) an inwardly-extending circumferential flange provided on an inner surface of the valve end cap and positioned for retaining the valve seat within the end cap.

2 Claims, 5 Drawing Sheets

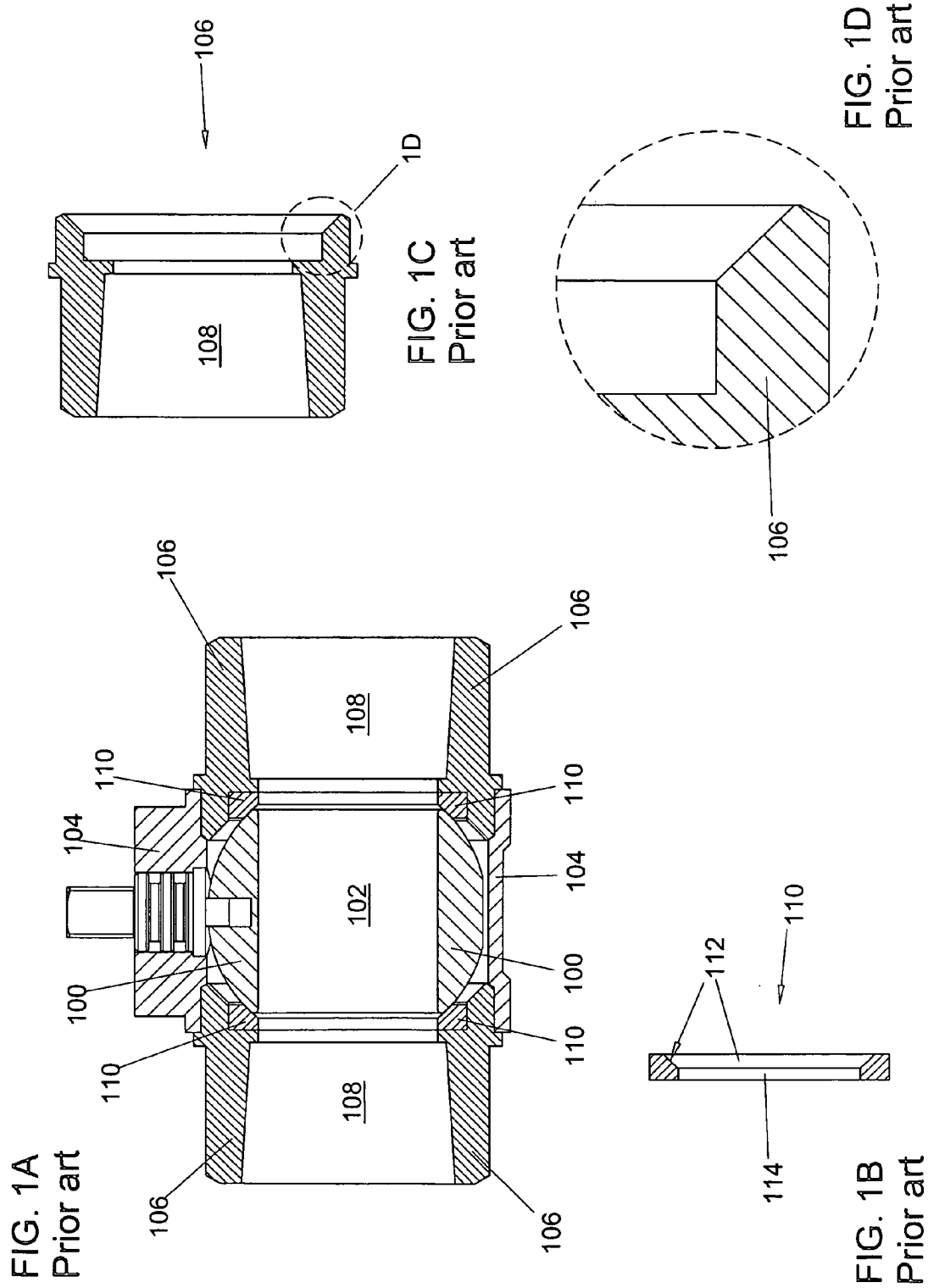

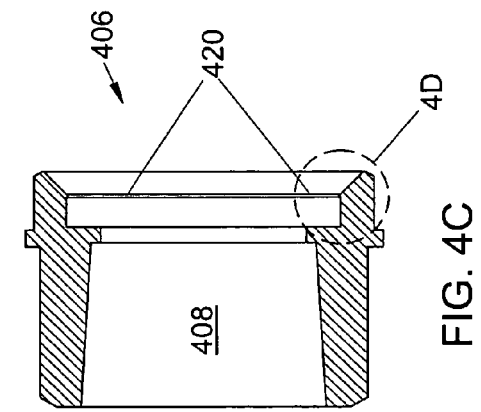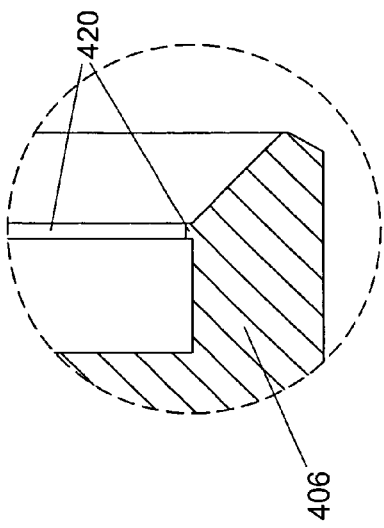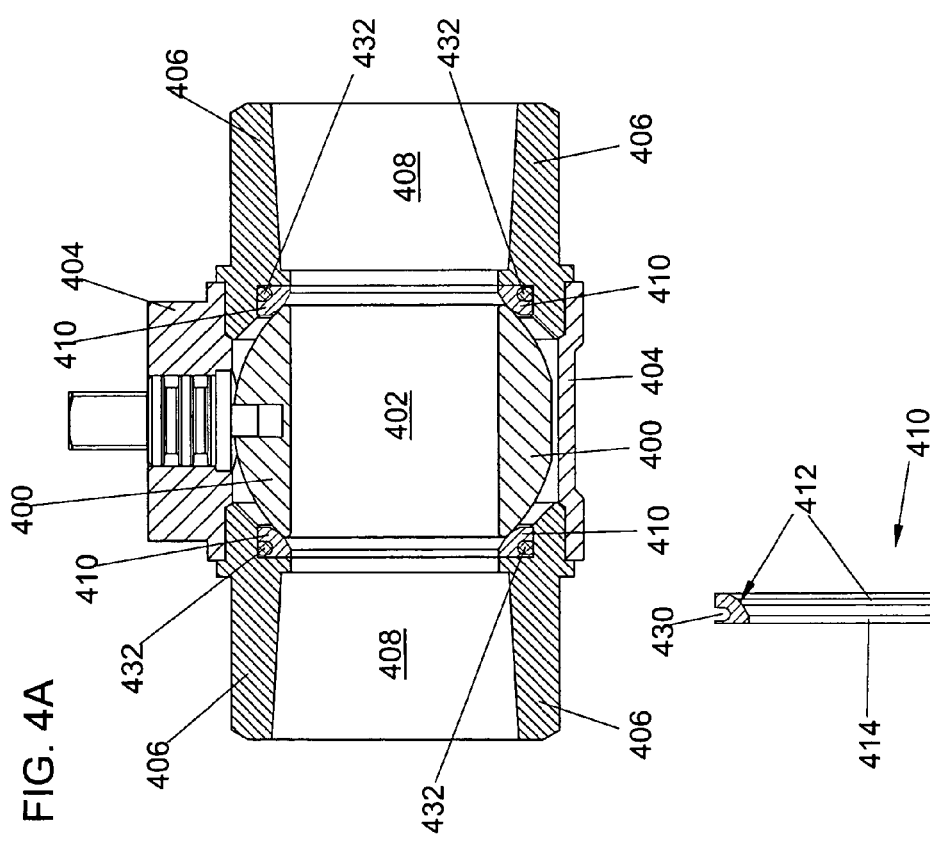

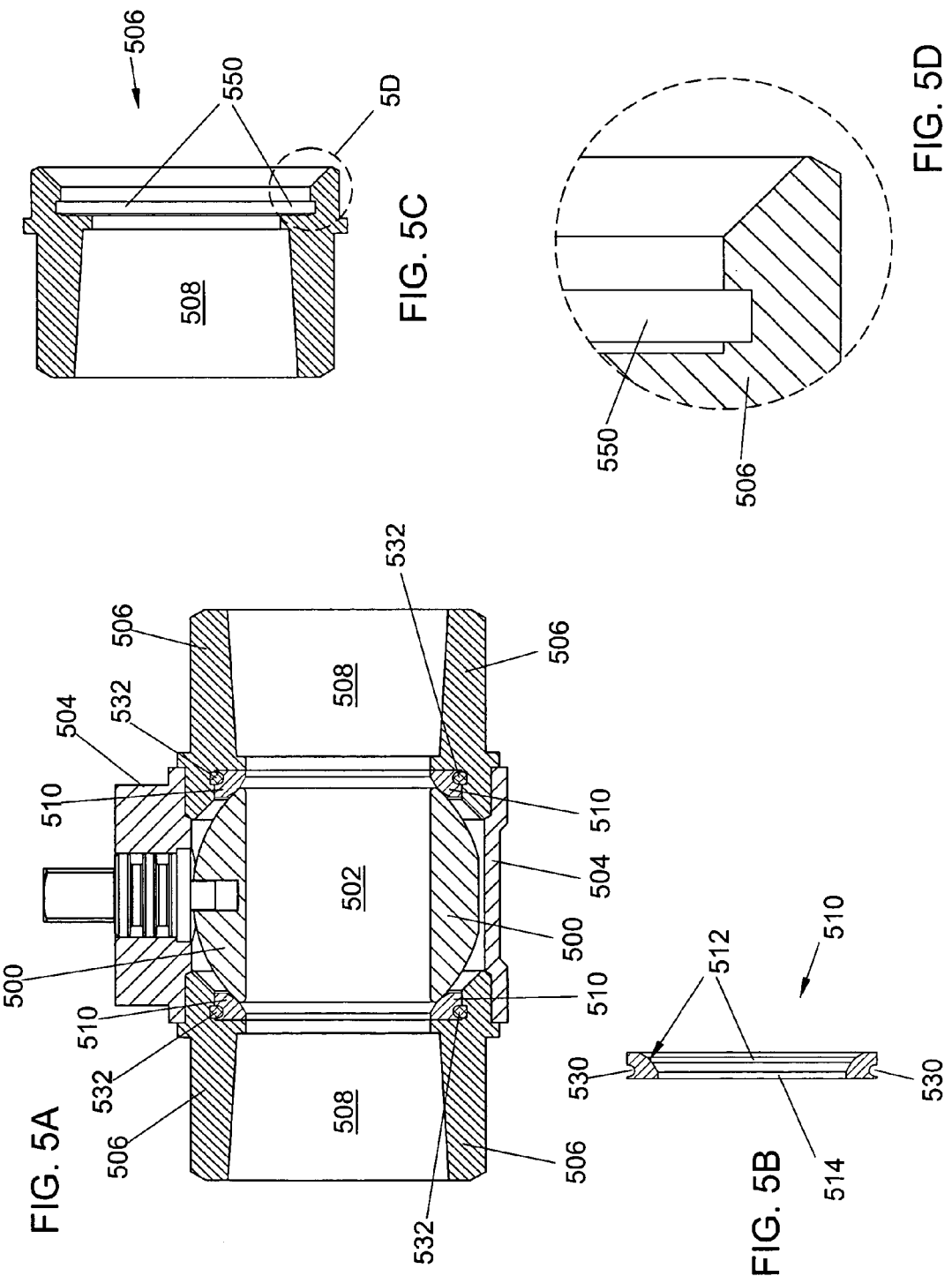

RETAINER FOR A BALL VALVE SEAT

RELATED APPLICATIONS

This application claims benefit of prior filed co-pending provisional Application No. 60/327,617 entitled "Retainer for a ball valve seat" filed Oct. 5, 2001 in the name of David B. Keiser, said provisional application being hereby incorporated by reference as if fully set forth herein.

FIELD OF THE INVENTION

The field of the present invention relates to ball valves. In particular, various retainers are described herein for a ball valve seat.

BACKGROUND

FIGS. 1A through 1D illustrate an example of a standard ball valve for controlling fluid flow. A ball 100 with a fluid passage 102 therethrough is positioned within a valve body 104 between valve end caps 106. Each end cap 106 is provided with a fluid passage 108. A valve seat 110 is positioned between each end cap 106 and ball 100, each valve seat having a ball-engaging surface 112 and a passage 114 therethrough. Each valve seat 110 forms a substantially fluid-tight seal through engagement of ball-engaging surface 112 and the surface of ball 100. In the fully open position, ball 100 is rotated so that passage 102 forms (substantially collinearly) with passages 108 and 114 a continuous fluid passage though the ball valve. In the closed position, ball 100 is rotated so that passage 102 does not communicate with passages 108 and 114. In addition to closed and fully open, intermediate rotational positions of ball 100 correspond to partially closed (equivalently, partially opened) valve positions, enabling the ball valve to be used for flow control and/or throttling.

Each valve seat 110 is axially constrained by engagement of surface 112 by the ball 100. In both the fully opened and the closed valve positions, a valve seat 110 is axially constrained by engagement of surface 112 with the surface of ball 100 along the entire circumference of valve seat 110. In a partially opened position, engagement of surface 112 with the surface of the ball 100 extends around only a portion of the circumference of the valve seat 110. It is possible for the non-engaged portion of the circumference of valve seat 110 to be axially displaced by hydrodynamic forces arising from fluid flow through the ball valve. This problem is exacerbated under high-flow-rate and/or high temperature conditions. Such axial displacement may be of particular concern on the input side of the ball valve, and may degrade the fluid-tight characteristics of the ball valve or even lead to damage to the valve seat 110. A valve seat 110 thus displaced may become trapped between an edge of passage 102 and valve body 104 or end cap 106 when the valve is closed and thereby suffer damage.

It is therefore desirable to provide apparatus and methods for retaining a ball valve seat in its properly-engaged position within a ball valve. It is therefore desirable to provide apparatus and methods for retaining a ball valve seat in its properly-engaged position within a ball valve when the ball valve is in a partially-opened position. It is therefore desirable to provide apparatus and methods for retaining a ball valve seat in its properly-engaged position within a ball valve wherein the entire circumference of the valve seat is axially constrained. It is therefore desirable to provide apparatus and methods for retaining a ball valve seat in its properly-engaged position within a ball valve wherein the entire circumference of the valve seat is axially constrained when the ball valve is in a partially-opened position.

SUMMARY

Certain aspects of the present invention may overcome one or more aforementioned drawbacks of the previous art and/or advance the state-of-the-art of ball valves, and in addition may meet one or more of the following objects:

To provide apparatus and methods for retaining a ball valve seat in its properly-engaged position within a ball valve;

To provide apparatus and methods for retaining a ball valve seat in its properly-engaged position within a ball valve when the valve is in a partially-opened position;

To provide apparatus and methods for retaining a ball valve seat in its properly-engaged position within a ball valve wherein the entire circumference of the valve seat is axially constrained;

To provide apparatus and methods for retaining a ball valve seat in its properly-engaged position within a ball valve wherein the entire circumference of the valve seat is axially constrained when the ball valve is in a partially-opened position;

To provide apparatus and methods for retaining a ball valve seat wherein the ball valve seat is retained by an inwardly-extending circumferential flange provided on an inner circumferential surface of a respective valve end cap of the ball valve;

To provide apparatus and methods for retaining a ball valve seat wherein the ball valve seat is provided with an outer circumferential groove, and compression of an O-ring within the groove by and inner circumferential surface of a respective valve end cap of a ball valve serves to retain the valve seat within the respective valve end cap; and To provide apparatus and methods for retaining a ball valve seat wherein the ball valve seat is provided with an outer circumferential groove and a respective valve end cap of a ball valve is provided with a corresponding inner circumferential groove, and engagement of an O-ring within the grooves serves to retain the valve seat within the respective valve end cap.

One or more of the foregoing objects may be achieved in the present invention by a ball valve comprising: a) a valve body; b) a pair of valve end caps connected to the valve body on opposing sides thereof; c) a valve ball rotatably positioned within the valve body between the valve end caps and having a fluid passage therethrough; d) a pair of valve seats, each valve seat being positioned between the valve ball and a respective valve end cap and engaged therewith; and at least one of e) an O-ring positioned within an outer circumferential groove provided on a valve seat and compressively engaged with an inner circumferential surface of the respective valve end cap so as to retain the valve seat within the respective valve end cap, f) a circumferential groove provided on an inner circumferential surface of the respective valve end cap and positioned for receiving the O-ring positioned within the outer circumferential groove of the valve seat so as to retain the valve seat within the respective valve end cap, and g) an inwardly-extending circumferential flange provided on an inner circumferential surface of the respective valve end cap and positioned so as to retain the valve seat within the valve end cap.

One or more of the foregoing objects may be achieved in the present invention by one or more methods for fabricating a ball valve that may include one or more of the steps of: a)

providing the valve seat with an outer circumferential groove and positioning an O-ring therein, and positioning the valve seat and O-ring within a respective valve end cap so as to compressively engage the O-ring with an inner circumferential surface of the respective valve end cap, thereby retaining the valve seat within the respective valve end cap; b) providing the valve seat with an outer circumferential groove and positioning an O-ring therein, providing the respective valve end cap with a corresponding inner circumferential groove for receiving the O-ring, and positioning the valve seat and O-ring within the respective valve end cap so as to engage the O-ring within the inner circumferential groove of the respective valve end cap, thereby retaining the valve seat within the respective valve end cap; and c) providing an inwardly-extending circumferential flange on an inner circumferential surface of the respective valve end cap, the flange being positioned so as to retain the valve seat within the valve end cap, and positioning the valve seat within the respective valve end cap behind the flange, thereby retaining the valve seat within the respective valve end cap.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIGS. 1A, 1B, 1C, and 1D show a prior ball valve and components thereof.

FIGS. 4A, 4B, 4C, and 4D show a ball valve and components thereof according to the present invention.

FIGS. 5A, 5B, 5C, and 5D show a ball valve and components thereof according to the present invention.

Figure 2C:
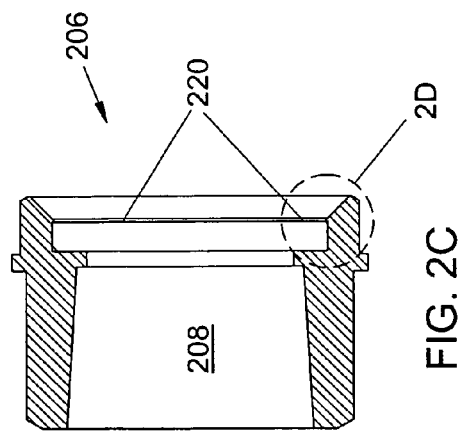
FIGS. 2A, 2B, 2C, and 2D show a ball valve and components thereof according to the present invention.

It should be noted that while symmetric two-port valves are shown in the drawings, apparatus and methods according to the present invention may be implemented on any one or more ports of a ball valve having two or more ports while remaining within the scope of inventive concepts disclosed and/or claimed herein.

DETAILED DESCRIPTION OF EMBODIMENTS

Figure 2D:
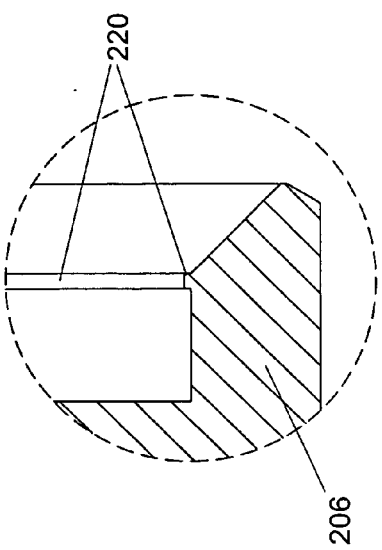
Figure 2A:
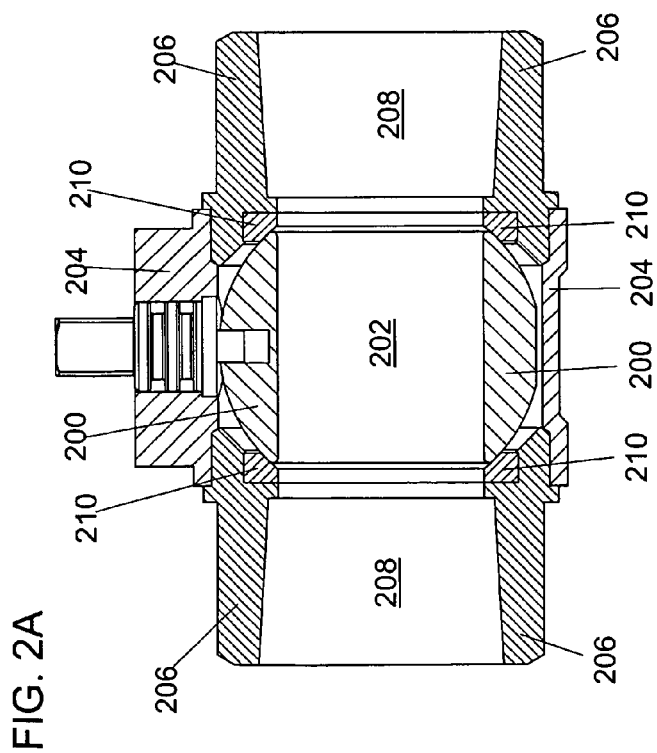
Figure 2B:
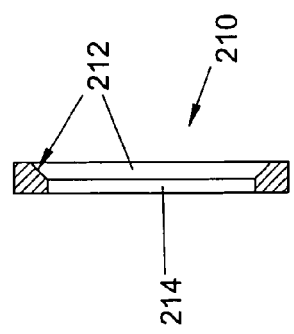

FIGS. 2A through 2D illustrate an example of a ball valve for controlling fluid flow according to the present invention. A ball 200 with a fluid passage 202 therethrough is positioned within a valve body 204 between valve end caps 206. Each end cap 206 is provided with a fluid passage 208. A valve seat 210 is positioned between each end cap 206 and ball 200, each valve seat having a ball-engaging surface 212 and a passage 214 therethrough. Each valve seat 210 forms a substantially fluid-tight seal through engagement of ball-engaging surface 212 and the surface of ball 200. In the fully open position, ball 200 is rotated so that passage 202 forms (substantially collinearly) with passages 208 and 214 a continuous fluid passage though the ball valve. In the closed position, ball 200 is rotated so that passage 202 does not communicate with passages 208 and 214. In addition to closed and fully open, intermediate rotational positions of ball 100 correspond to partially closed (equivalently, partially opened) valve positions, enabling the ball valve to be used for flow control or throttling.

At least one of valve end caps 206 (both in the exemplary valve shown in FIG. 2A) may be provide with an inwardly-extending circumferential flange 220. Flange 220 is positioned so as to retain valve seat 210 in its properly-engaged position within valve end cap 206, independent of any retention of the valve seat 210 resulting from the presence of valve ball 200. In particular, even when the ball valve is in a partially-opened position, flange 220 substantially axially constrains valve seat 210 around the entire circumference thereof, thereby substantially preventing axial displacement of valve seat 210 from its properly-engaged position within valve end cap 206. Flange 220 may preferably be made sufficiently small so as to allow a slightly deformable valve seat 210 to be forced therethrough during assembly of the ball valve, while still retaining valve seat 210 during operation of the valve. The precise dimensions of flange 220 required to allow this may depend on the size and relative dimensions of the various components of the ball valve and the particular materials used therefor, and may require some experimentation. Alternatively, valve end cap 206 and flange 220 may comprise separate components (not shown) that are assembled around valve seat 210, thereby allowing substantially rigid valve seats to be used.

Figure 3C:
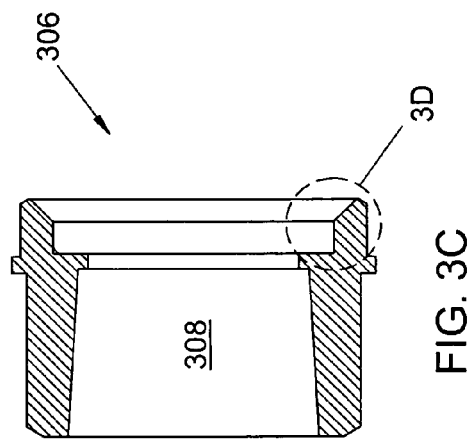
FIGS. 3A, 3B, 3C, and 3D show a ball valve and components thereof according to the present invention.
Figure 3D:
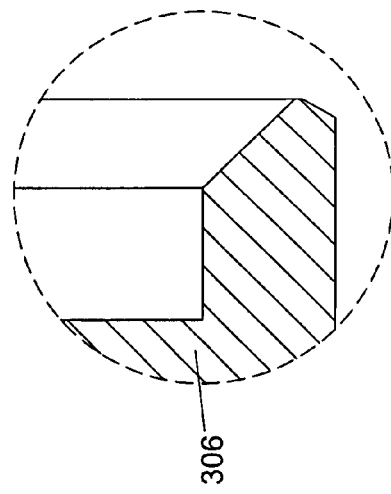
Figure 3A:
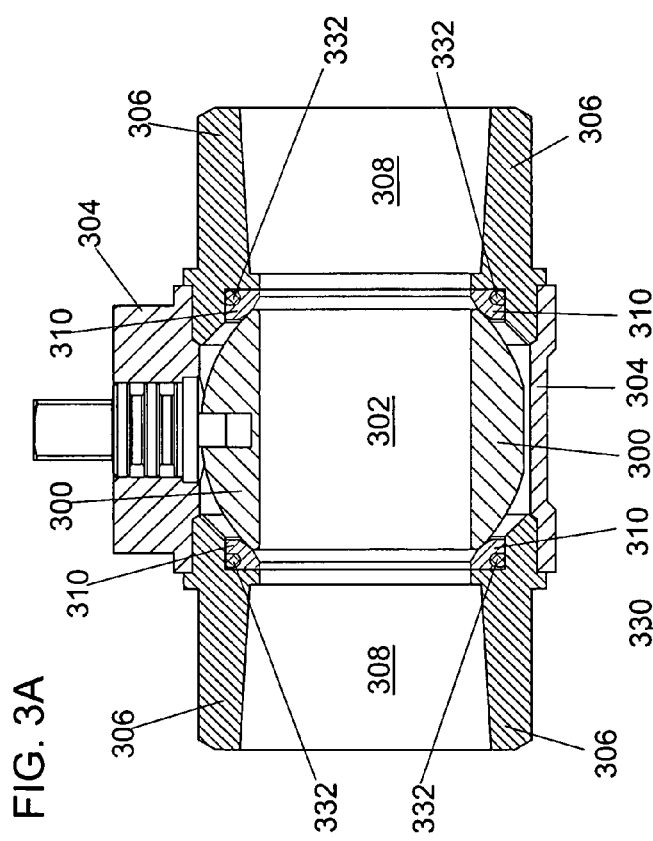
Figure 3B:
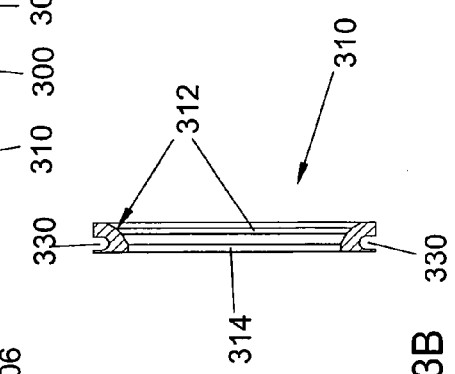

FIGS. 3A through 3D illustrate another example of a ball valve according to the present invention, including valve ball 300 with passage 302, valve body 304, valve end caps 306 with passages 308, valve seats 310 with passage 314 and engaging surface 312. In this example, valve seat 310 is provided on an outer circumferential surface thereof with groove 330 and O-ring 332 positioned therein. The size of O-ring 332 is such that it protrudes from groove 330 when not compressed (not shown). Positioning of valve seat 310 and O-ring 332 within valve end cap 306 results in compressive engagement of O-ring 332 with an inner circumferential surface of valve end cap 306 and retention of valve seat 310 therein, independent of any retention of the valve seat 310 resulting from the presence of valve ball 300.

FIGS. 4A through 4D illustrate another example of a ball valve according to the present invention, including valve ball 400 with passage 402, valve body 404, valve end caps 406 with passages 408, valve seats 410 with passage 414 and engaging surface 412. In this example valve seat 410 is axially constrained within the respective valve end cap 406 by both flange 420 as well as compressive engagement of O-ring 432 (positioned within groove 430) and an inner circumferential surface of valve end cap 406, independent of any retention of the valve seat 410 resulting from the presence of valve ball 400.

FIGS. 5A through 5D illustrate another example of a ball valve according to the present invention, including valve ball 500 with passage 502, valve body 504, valve end caps 506 with passages 508, valve seats 510 with passage 514 and engaging surface 512. This embodiment is similar to that of FIGS. 3A through 3D, and includes a groove 530 on an outer circumferential surface of valve seat 510 and an O-ring 532 positioned therein. An inner circumferential surface of the respective valve end cap 506 is provided with a circumferential groove 550 positioned so as to receive O-ring 532 when valve seat 510 is positioned within and properly engaged with valve end cap 506. Engagement of O-ring 532 within grooves 530 and 550 serves to retain valve seat 510 in its properly-engaged position within valve end cap 506, independent of any retention of the valve seat 510 resulting from the presence of valve ball 500. O-ring 532 should preferably be of a size to require compression during insertion of valve seat 510 within valve end cap 506. O-ring 532 and grooves 530 and 550 may be sized so that O-ring 532 is compressively engaged with grooves 530 and 550, or may be sized so that once engaged with grooves 530 and 550 O-ring 532 need not be compressed, but still serves to retain valve seat 510 within valve end cap 506. This embodiment may be further adapted to also include an inwardly protruding flange (not shown; similar to flange 220 of FIGS. 2A–2D) for retaining valve seat 510 within end cap 506.

While ball-engaging surface 212/312/412/512 of valve seat 210/310/410/510, respectively, is shown as a beveled convex surface in the drawings, these are exemplary only and not intended to limit the scope of the present invention. Any suitable shape may be employed for ball-engaging surface 212/312/412/512, including convex, flat, concave, curved, beveled, or any other suitable surface profile, while remaining within the scope of inventive concepts disclosed and/or claimed herein.

The present invention has been set forth in the forms of its preferred and alternative embodiments. It is nevertheless intended that modifications to the disclosed retainer for a ball valve seat may be made without departing from inventive concepts disclosed and/or claimed herein.

What is claimed is:

1. A ball valve, comprising:
    a central valve body;
    first and second valve end caps engaged with the valve body on opposing sides thereof;
    a valve ball rotatably positioned within the valve body between the valve end caps;
    a first valve seat positioned between and engaged with the valve ball and the first valve end cap;
    a second valve seat positioned between and engaged with the valve ball and the second valve end cap;
    an outer circumferential groove provided on at least one of the valve seats;
    an inner circumferential groove provided on at least one corresponding valve end cap and positioned opposite the outer circumferential groove;
    an O-ring received within and engaged with opposing inner and outer circumferential grooves so as to retain the valve seat within the corresponding valve end cap.

2. The ball valve of claim 1, at least one of the valve seats or at least one of the valve end caps being adapted for retaining at least one of the valve seats around substantially the entire circumference thereof.

* * * * *